Patented Oct. 2, 1923.

1,469,744

UNITED STATES PATENT OFFICE.

EDWARD WESSALE, OF WACONIA, MINNESOTA.

PROCESS OF AND APPARATUS FOR PREPARING CANE FOR EXTRACTION.

Application filed August 16, 1920. Serial No. 403,996.

*To all whom it may concern:*

Be it known that I, EDWARD WESSALE, a citizen of the United States, resident of Waconia, county of Carver, State of Minnesota, have invented certain new and useful Improvements in Processes of and Apparatus for Preparing Cane for Extraction, of which the following is a specification.

This invention relates to the manufacture of sirups and sugar from sorghum and sugar cane. It includes a process of and an apparatus for preparing sorghum and sugar cane for the milling process, known as the extraction, by removing the tops, leaves, sheaths, trash, pebbles, dirt, metal objects, etc., from the harvested cane prior to extracting the juices and sugar therefrom. The cane is mechanically passed under cutters of novel design to remove the tops, then the cane is cut into sections to sever the leaves and sheaths, etc., from the cane and to reduce trash which is among the cane material, to short lengths or sections, and finally the entire mass is subjected to shaking and screening in the presence of air blasts, completely separating them. This invention also includes a novel top-removing mechanism, a stalk-cutting mechanism, and the separating or cleaning mechanism. These mechanisms are cooperable successively to treat the cane fed thereto.

For a good grade of sorghum sirup all leaves and seed heads or tops must be removed from the cane, as these passing on through the mill tend to impart a bad flavor to the juice and resulting sirup, introduce more or less dirt and fine particles of plant material into the juice and retard clarification. Moreover, leaves which have become dry have a tendency to absorb juice as it is pressed out in the mill, thus decreasing the yield of juice and sirup.

Sorghum and sugar cane bear much foliage in the form of leaves and sheaths, and also seed-heads known as tops. All these together with suckers and some weeds contain many impurities and must be removed completely before subjecting them to the usual milling to extract the juices as these impurities pollute the juices. Therefore in current practice in the effort to reduce this disadvantage of getting impurities into the juices, it is usual manually to remove the tops, leaves, sheaths, and trash (suckers and weeds) before or during the harvesting operation of the cane, leaving the stalk its original length. This is a very expensive and tedious operation and at best the work is not effectively done. As a practical matter, the sheaths especially on sorghum are seldom removed at all.

It has been found that the tops, leaves, sheaths and trash can be much more effectively and less laboriously removed at the sirup or sugar factory by a preparatory or cleaning process prior to feeding the stalks to the cane mills. Through the employment of this novel process and apparatus the sugar or sorghum cane can be harvested in the field either with a corn binder or by hand without any preparatory work. By passing the harvested cane through a top-removing element, the tops are removed. Then, by cutting the stalks and remaining trash, leaves and sheaths into sections, the whole is converted into a loose mass of short sections of stalks, leaves, etc., in which the leaves as well as sheaths and trash are detached from the stalks. The entire mass is then subjected to a plurality of screenings in the presence of air blasts which effectively separate the refuse from the stalk sections and the sectioned stalks are in condition for extraction. The term "cane" is hereafter employed to signify the cane material as harvested in differentiation of the cleaned stalks.

The object of this invention is to provide a process of and an apparatus for preparing cane for extraction.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

Broadly considered, the invention consists in the process of and an apparatus for removing the leaves, sheaths, trash, pebbles, dirt, and other refuse from sorghum or sugar cane by first cutting the cane into sections and then subjecting the resultant mass to an air blast so that the cleaned or separated sectioned stalks are ready for the usual milling extracting process.

The apparatus for carrying out this process consists generally in a device adapted automatically to cut the tops from the harvested cane, a conveyor to carry the topped cane to a cutting means which cuts the cane into sections, and means for subjecting the sectioned cane to an air blast to drive off the lighter refuse whereby the clean sectioned stalks may be recovered. Referring more in detail to the elements comprising the selected embodiment of this apparatus as here disclosed, there is provided a conveyor to receive the harvested cane and to present the same to the top-removing means and thereafter to deposit the topped cane upon a traveling belt conveyor which presents the topped cane to a cutting means by which the cane is cut into sections, thus separating to a great degree the stalks from the refuse; thereafter another conveyor, here shown as a bucket conveyor or elevator, receives the sectioned cane from such cutting means to carry the same to the separator or cleaner which shakes, screens and subjects the sectioned cane consisting of stalks and refuse to an air blast and causes the lighter refuse to be blown from the stalks and permits the relatively small and heavy refuse particles such as dirt, stones, seeds, pieces of metal, etc., to drop through the screens and be thereby removed from the screened, cleaned stalk sections which are collected in a suitable receptacle ready to undergo the usual milling process for extraction of juice.

In the selected embodiment of the novel apparatus here shown, the cane as received from the field is first treated by the top-removing mechanism. The cane is thrown upon the inclined platform 1. Such platform is preferably stationary and means are provided for causing the harvested cane to travel thereover. Such means are here shown as a plurality of endless chains 2. Each of these chains travels over upper sprocket wheels 3 and lower sprocket wheels 4. The three upper sprocket wheels 3 are each fast upon a shaft 5 while the lower sprocket wheels 4 are similarly mounted upon a shaft 6 rotatably borne in bearings provided by the brackets 7. The platform and brackets are suitably supported as by standards 8. The upper sprocket shaft 5 is actuated by a chain 9 engaging a sprocket 10 fast upon the shaft 5. The chain 9 is driven by a sprocket 11 fast upon a stub shaft 12 which bears a gear 13 in mesh with a pinion 14 upon the counter-shaft 15. The counter-shaft 15 has also fast thereon a pulley 16 engaged by a belt 17 running over idlers 18 borne by the leg 19 of the adjacent conveyor frame. The belt 17 is in turn driven by a pulley 20 fast upon the main driven power or line-shaft 21. This line-shaft 21 is actuated by a suitable power means not necessary here to be shown.

The three chains 2 are provided with studs 22 which upwardly project at spaced intervals from the chains. The function of the studs 22 is to engage and upwardly carry the harvested cane over the platform 1.

Figure 2:
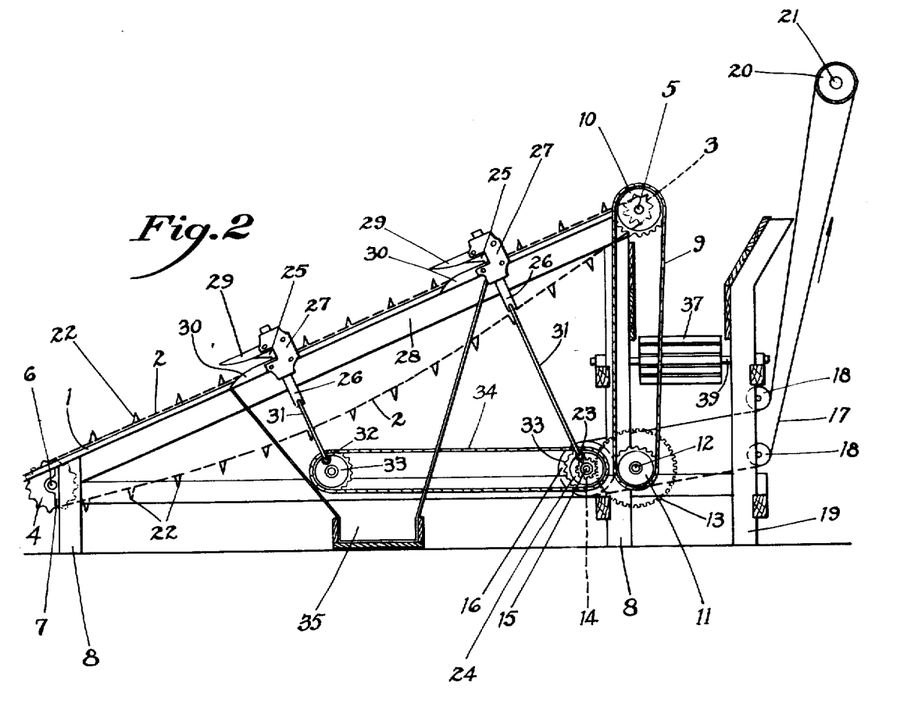
Figure 2 is an elevation of the top-removing mechanism.

The harvested cane is first placed upon the platform 1 so as to be conveyed upwardly by the studs 22 of the chains 2. The seed-heads or tops are manually arranged so that the cane portion adjacent the tops may be severed from the remainder of the cane. This severance is effected in this mechanism by the means of the triangular shaped knife 25. Two similar severing devices are here shown. The purpose of employing two such severing devices is to permit an operative to re-arrange any cane which was not topped by the first knife due to any negligence in initial arrangement of the cane upon the chains 2. These two severing devices are alike and but one will be necessary to be described. The knife 25 is mounted upon a bar 26 which is reciprocally slidable in a bracket 27 carried by the frame 28 of the platform. An upper stationary blade 29 and a lower stationary blade 30 downwardly project from the brackets 27 in spaced relation. The space between the divergent opposed edges of the stationary blades is sufficient to permit entry of the cane to be topped. The knife 25 is adjacent the inner face of the two stationary blades and co-operates therewith in its reciprocating movement to sever the tops from the cane. The knife 25 is actuated in timed relation to the movement of the cane by the chains so that upon successive raisings of the knife 25, successive amounts of the top end portions of the cane enter between the stationary blades and are successively severed by the downward strokes. In practical operation, the chains preferably travel between twenty and forty feet per minute and the knife strokes are accordingly timed. Each reciprocating bar 26 of each knife 25 is provided with a rod 31 pivotally secured thereto and the lower end of each rod 31 is pivotally borne by an eccentrically mounted pin 32. The two severing devices are slightly offset. Hence, while the eccentric pin 32 of the lower knife rod is borne by a sprocket 33, the eccentric pin 23 of the upper knife rod is borne by a disk 24 fast on the shaft 15 which also has fast thereon another sprocket 33.

Each of the two sprockets 33 is suitably journaled on the platform frame and the forward sprocket is driven by means of the chain 34 which is carried by the rear sprocket 33 fast upon the previously mentioned counter-shaft 15. The seed-heads or tops, upon removal, drop into a hopper 35 from which they may be subsequently removed for seeding, feeding or fuel purposes.

The cane, after the top-removal step, is next presented to the cutting means which functions to cut the cane into relatively short sections. As this novel process is at present carried out, the cane is cut into sections about four and one-half inches to five inches in length. This particular apparatus is adjusted to treat sorghum cane in which the free leaf is about twenty-four inches while the sheath closely adjacent the stalk is about ten inches. Hence, when the cane is cut into four and one-half inch sections, the maximum sheath portion remaining on the stalk is only four and one-half inches while the whole leaf and a portion of the sheath is separated therefrom.

A conveyor is positioned below the level of the upper terminal edge of the platform 1 to receive the topped cane as it is carried over the edge and dropped therefrom. This conveyor preferably consists of two opposed endless chains 36 (see Figure 4) to which are transversely secured a plurality of cleats or bars 37 in closely spaced relation to form an endless apron to convey the cane thereon. As the topped cane drops upon this traveling apron, the cane is presented to the cutting means with the bottom or butt end first. Rearwardly, adjacent the top-remover, the apron chains 36 engage the opposed idler sprockets 38 fast on a stud shaft 39 rotatably borne by the standard 8 and the leg 19 (see Figure 2). Forwardly, the chains 36 engage and are driven by two opposed sprockets 40 which are keyed to a shaft 41 (see Figure 3).

As the cutting means is of the reciprocating knife type which has an effective drawing action in transversely slicing the cane into the desired short sections, it is therefore preferable to provide the conveyor with an intermittent motion so that during the cutting or slicing operation the presented cane is held stationary. The means for intermittently driving the shaft 41 will be pointed out subsequently in connection with the description of the operation of the cutting means.

Figure 5:
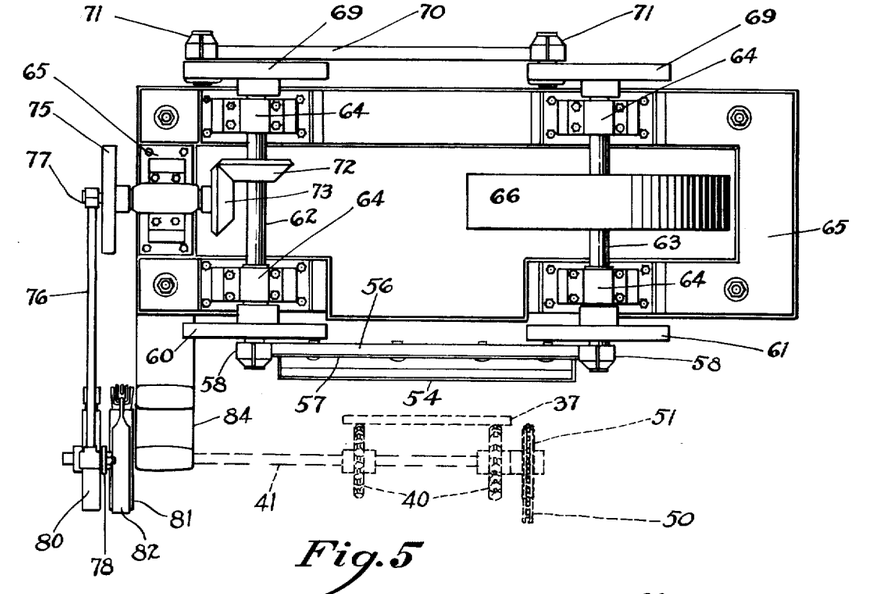
Figure 5 is a plan view of the cutting means.

A plurality of idler rollers 42 are rotatably journaled on brackets carried by the longitudinal support 43 of the conveyor frame. The two endless chains 36 move over the surfaces of these rollers which aid in supporting the load during the working travel of the apron. It is preferable to provide a second apron moving both adjacent to and in the same direction as the working apron. The purpose of this supplemental apron is to hold the cane firmly when it is approaching and also during the slicing operation. This supplemental apron is similar to the conveyor apron and consists of opposed chains 44 having bars 45 transversely secured thereto. These chains are mounted upon opposed sprockets 46 and 47 rotatably borne by the conveyor frame. The rear sprockets 47 are preferably keyed to a stud shaft 48 which has also fast thereon a sprocket 49 by means of which the supplemental apron is driven from the apron shaft 41 by means of a chain 50 driven by a sprocket 51 fast on the shaft 41 (see Figure 5). The chain 50 is engaged by the idlers 52 and 53, rotatably borne by the conveyor frame. By means of this drive, adjacent and opposed faces of the two aprons are driven in the same direction and at the same rate of speed. Likewise, as the apron is intermittently driven from the shaft 41, the supplemental apron will similarly be intermittently driven.

Figure 3:
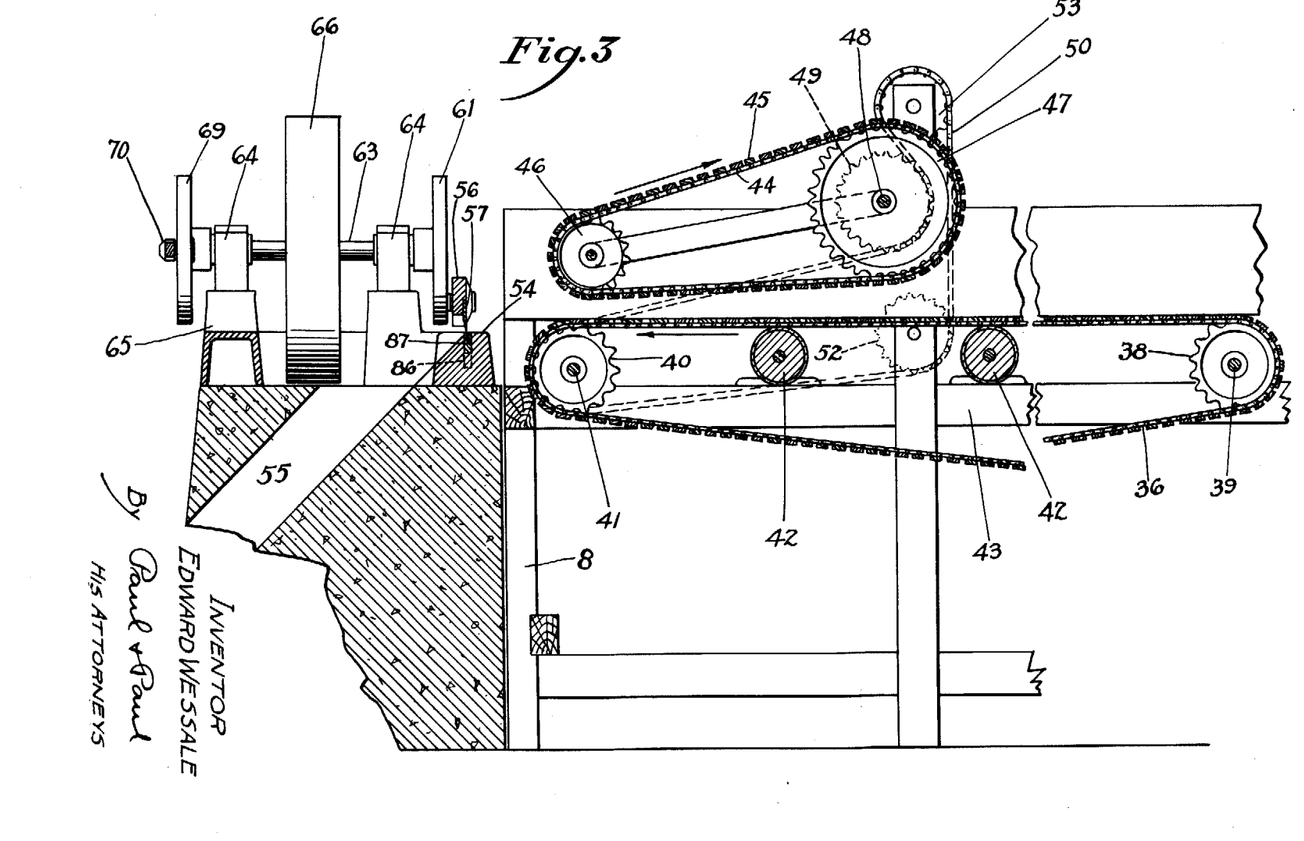
Figure 3 is a longitudinal sectional view through the cutting means and through the conveyor leading thereto.
Figure 4:
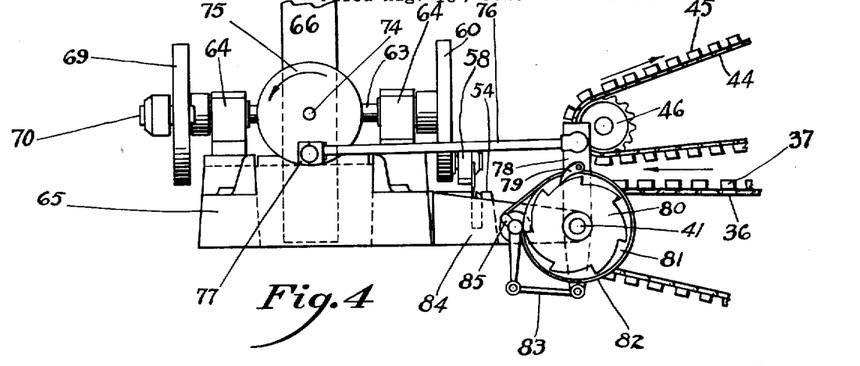
Figure 4 is a detailed view showing the conveyor drive and stop-motion.

The next step is the cutting of the presented cane into sections. The cutting means is located adjacent the forward terminus of the conveyor. A platform 54 extends transversely the front end of the conveyor and is adapted to receive the cane as discharged thereon by the conveyor. The central major portion of this block 54 is cut away, as is shown in Figure 3, to form an upward continuation of a chute 55 provided through the preferably concrete foundation upon which is mounted the cutting means. This chute is adapted to receive the sectioned cane. The cutting element consists of an elongated knife bar 56 carrying a knife 57. The knife bar is terminably mounted in bearing boxes 58 pivotally carried on pins 59 eccentrically mounted on disks 60 and 61 keyed respectively to shafts 62 and 63. Both shafts are rotatably mounted in bearings 64 provided by the base of the cutting means. The shaft 63 has a pulley 66 keyed thereto which is actuated by a belt 67 by a pulley 68 on the line shaft 21. The cutting means is therefore driven from the line shaft. Upon the ends of the shafts 62 and 63 opposite to the disks 60 and 61 are keyed wheels 69. A connecting rod 70 has its terminals pivoted to bearing boxes 71 eccentrically mounted on the wheels 69. This connecting rod is preferably a quadrant in advance of the knife bar 56. A bevel gear 72 is keyed to the shaft 62 and meshes with the gear 73 carried by a stud shaft 74 journaled on the base 65. This shaft 74 has a disk 75 keyed thereon. A connecting rod 76 is borne at one end by a bearing box 77 eccentrically mounted on the disk 75 and its other end is pivoted to one end portion of a rocker arm 78 freely mounted on the shaft 41. A dog 79 is pivotally mounted on the upper portion of the rocker arm 78, as shown in Figure 4. The dog 79 is adapted to engage the teeth of a ratchet 80 which is fast on the shaft 41 whereby the shaft is given an intermittent rotation in one direction. The cane-presenting apron is thereby actuated by and in timed relation to the cutting mechanism through the shaft 41 as previously stated. In order that the momentum of the traveling apron may be arrested, a stop motion is employed. A drum 81 is keyed to the shaft 41 and is peripherally engaged by a brake band 82 of the internal contracting type. The brake band 82 is alternately contracted upon the drum and released therefrom by means of pivotally joined links 83 pivotally borne at the lower end by the lower portion of the rocker arm 78 and at the upper end pivotally borne by a bracket 84 extending from the base 65. The upper link 83 carries a finger 85 to which one end of the brake band is secured, the other end of the brake band being secured to the stationary bracket 84.

In the position of the mechanism, in Figure 4, the knife has completed the cutting operation, at which time the connecting rod 76 has moved to the right both to release the brake band and to carry the dog 79 to the right to engage a ratchet tooth in order to rotate the ratchet in counter clockwise direction toward the completion of which motion the brake band will be tightened on its drum and movement of the shaft 41 arrested.

Figure 6:
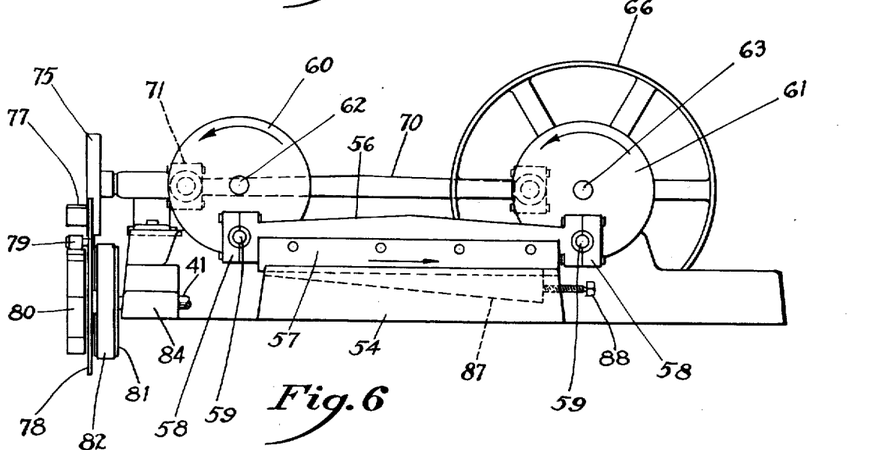
Figure 6 is a view in side elevation of the cutting means.

A recess 86 extends transversely of the platform 54, a bar 87, preferably of steel, is seated in this recess and is longitudinally slotted to receive the knife edge. Preferably the recess 86 is inclined at its lower surface, as shown in dotted lines in Figure 6. The lower face of the bar is similarly inclined. This inclination of the bottom surface of the recess and bar permits of a wear-compensating adjustment of the bar 87 by means of the adjusting screw 88 received in threaded engagement in an aperture leading to the recess 86.

After the sectioned cane passes through the chute 55 it is received in the elevator chamber 90. The cane is then presented to the separating or cleaning mechanism, which carries out the next step in the process.

The cane as it enters upon the next step in the process has been cut in relatively short sections. Not only are the valuable stalks so cut, but also are the leaves, trash, weeds, etc.

Figure 7:
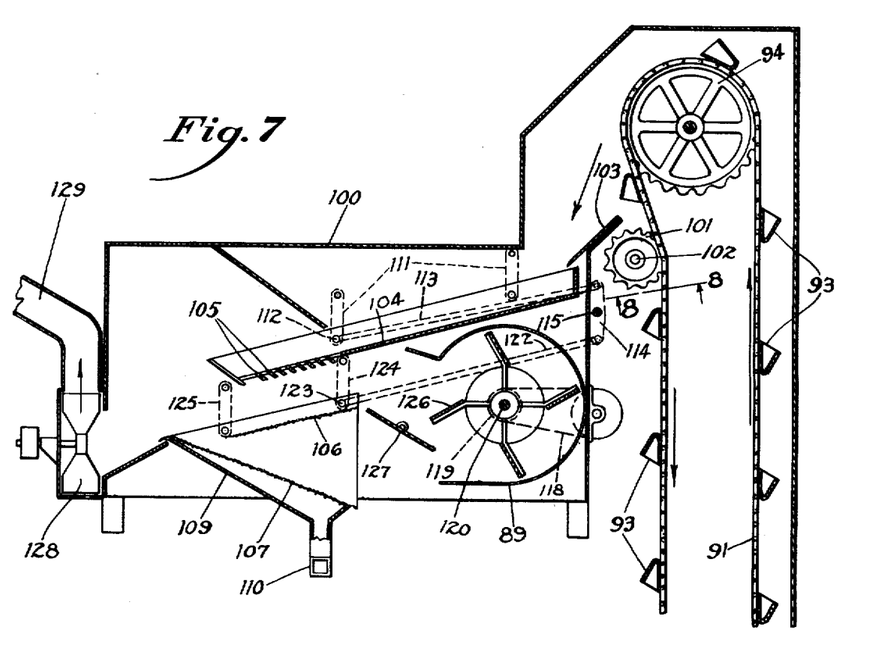
Figure 7 is a sectional view of the elevator and separator.

The sectioned cane is preferably raised by an endless carrier which is here shown as a bucket type elevator. The buckets scoop the sectioned cane from the bottom of the elevator chamber and, in passing over the top of their travel, are inverted and the cane is emptied and dropped in the direction of the arrow shown in Figure 7.

Figure 8:
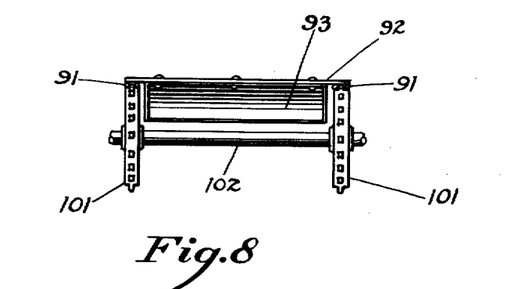
Figure 8 is a section on the line 8—8 of Figure 7.

The type of elevator at present employed comprises a pair of endless chains 91 having a plurality of straps 92 (see Figure 8) transversely secured to each of the opposed chains. The buckets 93 are secured to the transverse straps. The chains 91 travel over opposed pairs of sprocket wheels comprising the upper wheels 94 and the lower wheels 95. The lower sprocket wheels 95 are fast on the shaft 96 to which is also keyed a pulley 97 actuated by a belt 98 driven by a pulley 99 keyed to the line shaft 21. The upper portion of the elevator chamber 90 is enlarged and is provided with a passage leading to the interior of the separator housing 100. A pair of idlers 101 are journaled on a shaft 102 carried by the elevator chamber casing. The function of these idlers is to carry the chains away from the ledge 103 transversely extending across the opening leading to the separator housing.

Figure 1:
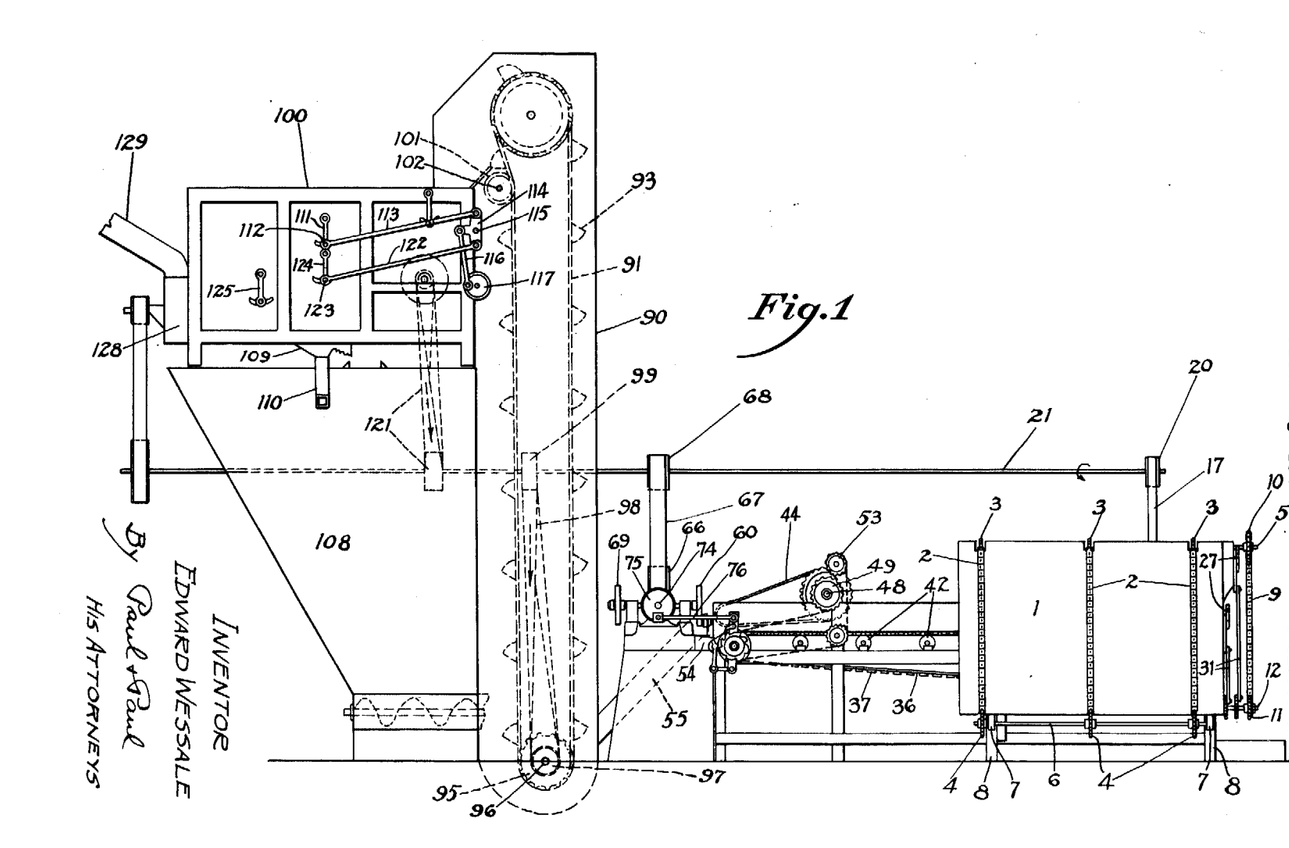
Figure 1 is a side elevation of the apparatus.

The separator housing includes a shake-frame 104 which is substantially U-shaped in cross section and is mounted to be reciprocated. This frame 104 is downwardly inclined away from the elevator and is adapted to receive the sectioned cane discharged from the elevator buckets. The bottom of this shake-frame adjacent its lower end is cut away and a plurality of baffle plates 105 are substituted therefor. These baffle plates transversely extend across the shake-frame bottom and each is reversely inclined to the direction of inclination of the shake-frame. These baffle plates not only permit the sectioned stalks traveling down the shake-frame to drop therefrom but also permit the passage of an air blast upwardly driven through the baffle plates in order to carry the leaves, trash, sheaths, weeds and the lighter refuse away from the heavier stalk sections. From the baffle plates the sectioned stalk drops through this upwardly directing air blast and is received upon the screen 106 which is adapted to be reciprocated. This screen is preferably inclined in the same direction as the shake-frame. While the sectioned stalks are downwardly traveling over the screen 106 (due to its inclination and reciprocating motion) an air blast is directed upwardly through the screen further to separate and carry off any of the lighter refuse material. From the screen 106 the cleaned stalk sections drop to a second screen 107. This screen is also subject to reciprocation but is reversely inclined to the direction of inclination of the shake-frame 104 and the screen 106. The clean stalk sections slide downwardly over this screen and are collected in the receptacle 108 and are removed from the base of the hopper by any convenient means, such as a screw conveyor, which is diagrammatically indicated in Figure 1.

The screens 106 and 107 are mounted in and carried by a hopper 109 which is mounted to reciprocate in the separator housing. The base of this hopper 109 terminates in a tubular member 110 which opens at the side of the machine. When the cane material reaches the baffle plates it frequently occurs that small stones, pebbles, lumps of dirt and other small and relatively heavy particles are carried therewith. The air blast through which the sectioned stalks drop does not remove these small and relatively heavy particles which drop, together with the stalk sections, upon the screen 106. The mesh of this screen is preferably such that the small particles may drop therethrough. In the present construction, this screen is made of quarter-inch mesh wire, which also sifts out any seeds which may have been carried through the apparatus. The small, heavy particles dropped through the screen 106 also may pass through the screen 107, which has a slightly larger mesh and hence may drop into the hopper 109 and be carried therefrom by the tubular member 110.

The shake-frame 104 is swingingly mounted by means of opposed pairs of links 111. The links are pivotally mounted at their upper ends to the sides of the separate housing while the lower ends of the links are pivotally secured to the sides of the shake-frame. The pivot pins 112 of the lower links 111 project outwardly through the casing housing and have pivotally secured thereto a connecting rod 113. This rod 113 is connected at one end to the pivot pin which is movable in a slot cut in the separator housing and at its other end is connected to one end of a rocker arm 114 pivotally mounted on a rock shaft 115 carried by the separator housing.

A similar rocker arm 114 is provided on the other side of the housing and each rocker arm is keyed to the shaft 115. The upper links 111 of the shake-frame are simply supporting links. The rocker arm 114 is actuated by connecting rod 116, the lower end of which is eccentrically mounted upon a disk 117 rotatably mounted on a bracket secured to the housing 100 and driven by means of the belt 118 (see Figure 7) carried by a pulley 119 fast on the fan shaft 120. This fan shaft is driven by a belt and pulley device 121 from the main line shaft 21.

The lower end of the rocker arm 114 has pivotally secured thereto a connecting rod 122 which forwardly is secured to a pivot pin 123 carried by a link 124 pivotally mounted on the outside of the housing 100. The pivot pin 123 inwardly projects through an arcuate slot into the housing interior and is secured to the side of the hopper 109. A lower idler link 125 is pivotally mounted on the outside of the separator housing and bears a pivot pin which inwardly projects through a suitable slot into the housing interior where it is fastened to the hopper 109. The link devices are similar on each side of the casing housing.

The air blast is generated by means of the fan 126 rotatable in the fan chamber 89 and keyed to the fan shaft 120. A deflector plate 127 is diagrammatically represented in Figure 7 and is adjustably mounted in order to vary the proportionate amount of air blast which shall pass directly to the baffle plates or shall pass through the screen 106, it being understood that the side of the hopper 109 facing the fan is open. The lower portion of the side of the separator housing opposite the elevator is open to afford communication with a chamber in which is positioned a blower 128. The function of this blower is to force air upwardly and outwardly through the pipe 129 from the interior of the housing and hence to draw out the lighter refuse material so that it may thereafter be recovered from the pipe 129 to be subsequently used for feed or fuel.

I claim as my invention:

1. The process of preparing cane for extraction which consists in mechanically conveying the cane past a topping mechanism and removing the tops, conveying the topped cane from the topping mechanism to a cutting mechanism, cutting the cane in short lengths, and subjecting the cut cane to an air blast to remove the lighter parts therefrom.

2. The process of preparing cane for extraction which consists in mechanically conveying the cane past a topping mechanism and removing the tops, conveying the topped cane from the topping mechanism to a cutting mechanism, cutting the cane in short lengths, and simultaneously shaking the cane and subjecting it to an air blast.

3. The process of preparing cane for extraction which consists in mechanically feeding the cane transversely through a topping mechanism to remove the tops, mechanically conveying the topped cane from the topping mechanism to a cutting mechanism and feeding it longitudinally therethrough whereby the topped cane is cut into short sections, and subjecting the cut cane to an air blast to remove the lighter parts therefrom.

4. The process of preparing cane for extraction which consists in mechanically feeding the cane transversely through a topping mechanism to remove the tops, mechanically conveying the topped cane from the topping mechanism to a cutting mechanism and feeding it longitudinally therethrough whereby the topped cane is cut into short sections, and simultaneously shaking the cane and subjecting it to an air blast.

5. The process of preparing cane for extraction which consists in mechanically feeding the cane transversely through a topping mechanism to remove the tops, mechanically conveying the topped cane from the topping mechanism to a cutting mechanism and feeding it longitudinally therethrough whereby the topped cane is cut into short sections, simultaneously shaking the cane and subjecting it to an air blast, passing the cleaned cane over a downwardly inclined path, and subjecting the cane passing over said path to an air blast in opposition to its movement over said path.

6. In an apparatus for preparing cane for extraction, the combination of means to receive and convey the harvested cane, severing means adjacent said conveyer to remove the tops from the cane, means automatically to receive and convey the topped cane therefrom, cutting means to cut the conveyed cane into sections, cleaning means to receive and clean the sectioned cane whereby the sectioned stalks may be recovered, and means at the lower end of the cleaning means for receiving the refuse from the cleaning means and forcing it away from the cleaning means.

In witness whereof, I have hereunto set my hand this 13" day of August, 1920.

EDWARD WESSALE.